United States Patent
Joo et al.

(10) Patent No.: US 7,308,062 B2
(45) Date of Patent: Dec. 11, 2007

(54) APPARATUS FOR PROVIDING SYSTEM CLOCK SYNCHRONIZED TO A NETWORK UNIVERSALLY

(75) Inventors: Bheom Soon Joo, Daejeon (KR); Jae Jeong Lee, Daejeon (KR); Hae Won Jung, Daejeon (KR); Young Sun Kim, Daejeon (KR)

(73) Assignee: Electronics and Telecommunications Research Institute (KR)

( * ) Notice: Subject to any disclaimer, the term of this patent is extended or adjusted under 35 U.S.C. 154(b) by 685 days.

(21) Appl. No.: 10/927,412

(22) Filed: Aug. 25, 2004

(65) Prior Publication Data

US 2005/0135530 A1    Jun. 23, 2005

(30) Foreign Application Priority Data

Dec. 17, 2003  (KR) ............... 10-2003-0092570
Apr. 19, 2004  (KR) ............... 10-2004-0026638

(51) Int. Cl.
*H04L 7/00* (2006.01)
(52) U.S. Cl. .................. 375/356; 375/376
(58) Field of Classification Search ............. 375/354, 375/356, 371–373, 376; 370/504; 327/140, 327/144, 145–147, 155–156
See application file for complete search history.

(56) References Cited

U.S. PATENT DOCUMENTS

| 5,525,935 A | 6/1996 | Joo et al. | |
| 5,790,614 A | 8/1998 | Powell | |
| 6,304,582 B1 * | 10/2001 | Zhang et al. | 370/503 |
| 6,813,721 B1 * | 11/2004 | Tetreault et al. | 713/400 |

FOREIGN PATENT DOCUMENTS

| JP | 08-163114 | 6/1996 |
| KR | 92003362 B1 | 4/1992 |
| KR | 93002064 B1 | 3/1993 |
| KR | 93008724 B1 | 9/1993 |
| KR | 95003655 B1 | 4/1995 |
| KR | 95003657 B1 | 4/1995 |
| KR | 97003097 B1 | 3/1997 |
| KR | 00123067 B1 | 9/1997 |
| KR | 00126856 B1 | 10/1997 |
| KR | 00194805 B1 | 2/1999 |
| KR | 00262945 B1 | 5/2000 |
| KR | 1020030058558 A | 7/2003 |
| WO | WO 2004/086686 | * 10/2004 |

* cited by examiner

*Primary Examiner*—Tesfaldet Bocure
(74) *Attorney, Agent, or Firm*—Blakely, Sokoloff, Taylor & Zafman

(57) ABSTRACT

Provided is an apparatus for providing a system clock synchronized to a network universally. The apparatus includes a network synchronization reference signal generating unit that outputs a reference signal for network synchronization; a network synchronization controller that generates a first control voltage that allows a first clock pulse to be in synchronization with the reference signal for network synchronization; an OVCXO that generates the first clock pulse by application of the first control voltage; a system synchronization reference signal generator that generates reference signals for system synchronization; a system synchronization controller that generates a second control voltage that allows the system clock to be in synchronization with the reference signal for system synchronization; a VCO that generates a second clock pulse by application of the second control voltage; and a system clock generator that outputs the system clock. Accordingly, it is possible to apply to systems requiring network synchronization.

5 Claims, 4 Drawing Sheets

APPARATUS FOR PROVIDING SYSTEM CLOCK SYNCHRONIZED TO A NETWORK UNIVERSALLY

BACKGROUND OF THE INVENTION

This application claims the priority of Korean Patent Application Nos. 2003-92570, filed on Dec. 17, 2003 and 2004-26638, filed on Apr. 19, 2004 in the Korean Intellectual Property Office, the disclosures of which are incorporated herein in their entirety by reference.

FIELD OF THE INVENTION

The present invention relates to an apparatus for providing a system clock synchronized to a network to all systems operating in synchronization with the network.

DESCRIPTION OF THE RELATED ART

FIG. 1A is a block diagram of a conventional apparatus for providing a system clock to a system that operates in synchronization with a network. Referring to FIG. 1A, the conventional apparatus generates the system clock in synchronization with a network reference signal input via an external network (not shown). When the network reference signal contains an error, the apparatus generates the system clock in synchronization with an additional backup clock source using a oscillator that satisfies precision and stability of clock according to their hierarchy in the network. However, the conventional apparatus of FIG. 1A is disadvantageous in that the quality of the system clock is greatly influenced by external, environmental factors of the network. Also, since the backup clock functions separately from the network reference signal, data loss is unavoidable when an error occurs in the network reference signal.

To solve this problem, as shown in FIG. 1B, an ovenized voltage-controlled crystal oscillator (OVCXO) that satisfies precision and stability of clock according to their hierarchy in a network is manufactured to generate a backup clock source with system inherent frequency characteristics. That is, the system clock is obtained by synchronizing the backup clock with a network reference signal input via an external network. When the network reference signal contains an error, it is possible to prevent data loss for a predetermined period of time by maintaining the oscillation frequency of the backup clock source that operates normally.

However, even use of the backup clock source with system inherent frequency characteristics does not provide a solution to problems caused by the difference of the network synchronization controllers of various systems having different designs. For instance, since systems have different system inherent frequency characteristics, a backup clock source must be manufactured according to the type of system adopted, thereby increasing time and costs for developing and manufacturing the system.

SUMMARY OF THE INVENTION

The present invention provides an apparatus for providing a system clock synchronized to a network universally, the apparatus including a network synchronization unit adopting a common ovenized voltage-controlled crystal oscillator (OVCXO), which has frequency characteristics of 5 MHz or 10 MHz and a high-precision of $1\times10^{-7}$ to $5\times10^{-10}$ Hz and is generally used in the fields of communications and measurement, rather than a backup clock source with system inherent frequency characteristics, and a system synchronizing unit adopting a common voltage-controlled oscillator (VCO) with frequency characteristics of several GHz and a range of frequency displacement of $1\times10^{-3}$ Hz or more.

According to one aspect of the present invention, there is provided an apparatus for generating a system clock synchronized to a network, the apparatus comprising a network synchronization reference signal generator receiving at least one reference signal from a communications network, selecting one of the received reference signal, frequency-dividing the selected reference signal, and outputting a reference signal for network synchronization; a network synchronization controller receiving the reference signal for network synchronization and a first clock pulse, and generating a first control voltage that allows the first clock pulse to be in synchronization with the reference signal for network synchronization; an ovenized voltage-controlled crystal oscillator (OVCXO) generating the first clock pulse whose phase and frequency are changed by application of the first control voltage; a system synchronization reference signal generator receiving the first clock pulse, frequency-dividing the first clock pulse, and generating different reference signals for system synchronization according to the types of systems, the reference signal for system synchronization being used for synchronizing the system clock; a system synchronization controller receiving the reference signal for system synchronization and the system clock, and generating a second control voltage that allows the system clock to be in synchronization with the reference signal for system synchronization; a voltage-controlled oscillator (VCO) generating a second clock pulse whose phase and frequency are changed by application of the second control voltage; and a system clock generator receiving the second clock pulse, frequency-dividing the second clock pulse, and outputting the system clock.

BRIEF DESCRIPTION OF THE DRAWINGS

The above and other aspects and advantages of the present invention will become more apparent by describing in detail exemplary embodiments thereof with reference to the attached drawings in which.

DETAILED DESCRIPTION OF THE INVENTION

Figure 1A:
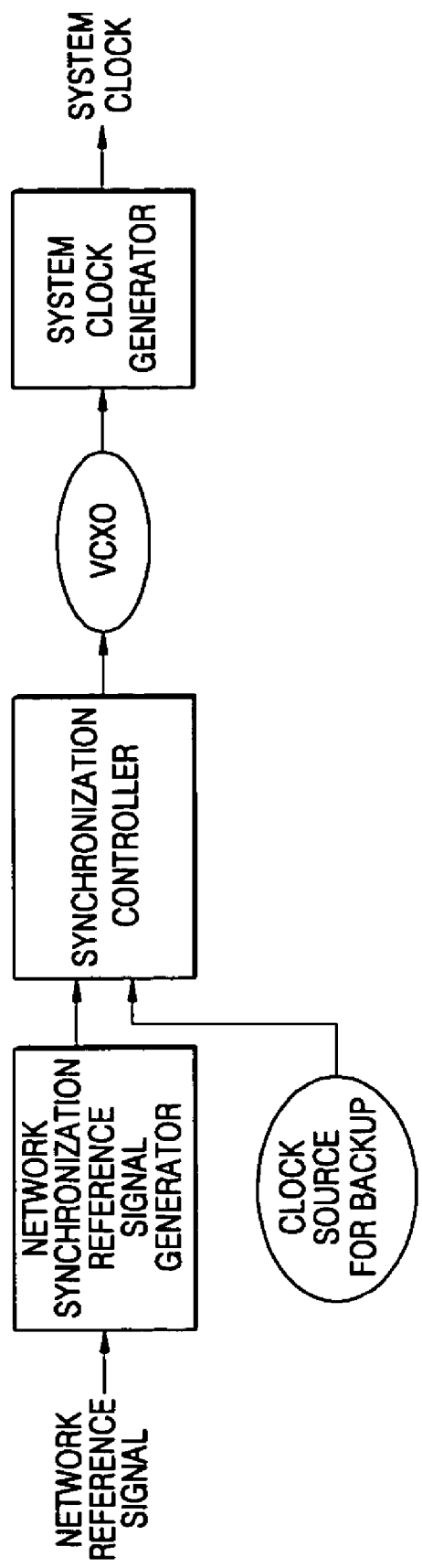
FIGS. 1A and 1B are block diagrams of conventional apparatuses for providing a system clock in synchronization with a network.
Figure 1B:
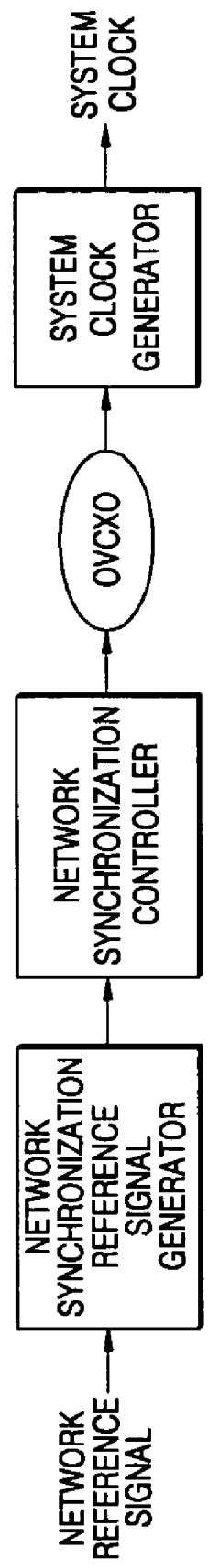

Exemplary embodiments of the present invention will be described in detail with reference to the attached drawings. The same reference numerals represent the same elements throughout the drawings.

Figure 2:
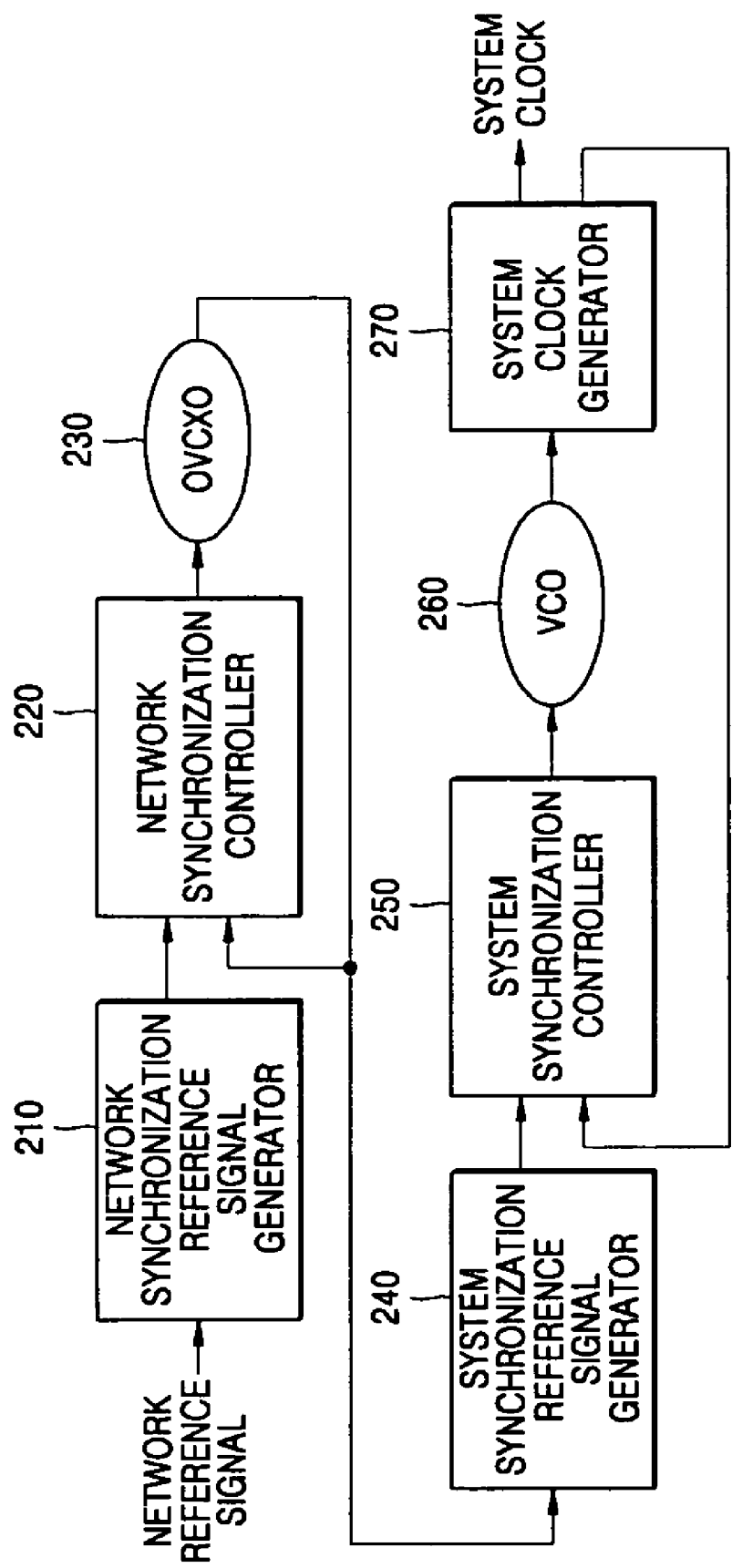
FIG. 2 is a block diagram of an apparatus for providing a system clock in synchronization with a network, according to an embodiment of the present invention.

Referring to FIG. 2, a network synchronization reference signal generator 210 receives a plurality of network reference signals from a communications network, selects one of the plurality of network reference signals, and generates and outputs a network synchronization reference signal by frequency-dividing the selected signal. In this connection, Korean Patent No. 64907 discloses a network synchronization reference clock board assembly, Korean Patent No. 89836 discloses a circuit for selecting and frequency-dividing a network synchronization reference clock input in an electronic switching system, and Korean Patent No. 126856 discloses an apparatus for selecting an input reference clock for synchronization.

Figure 3:
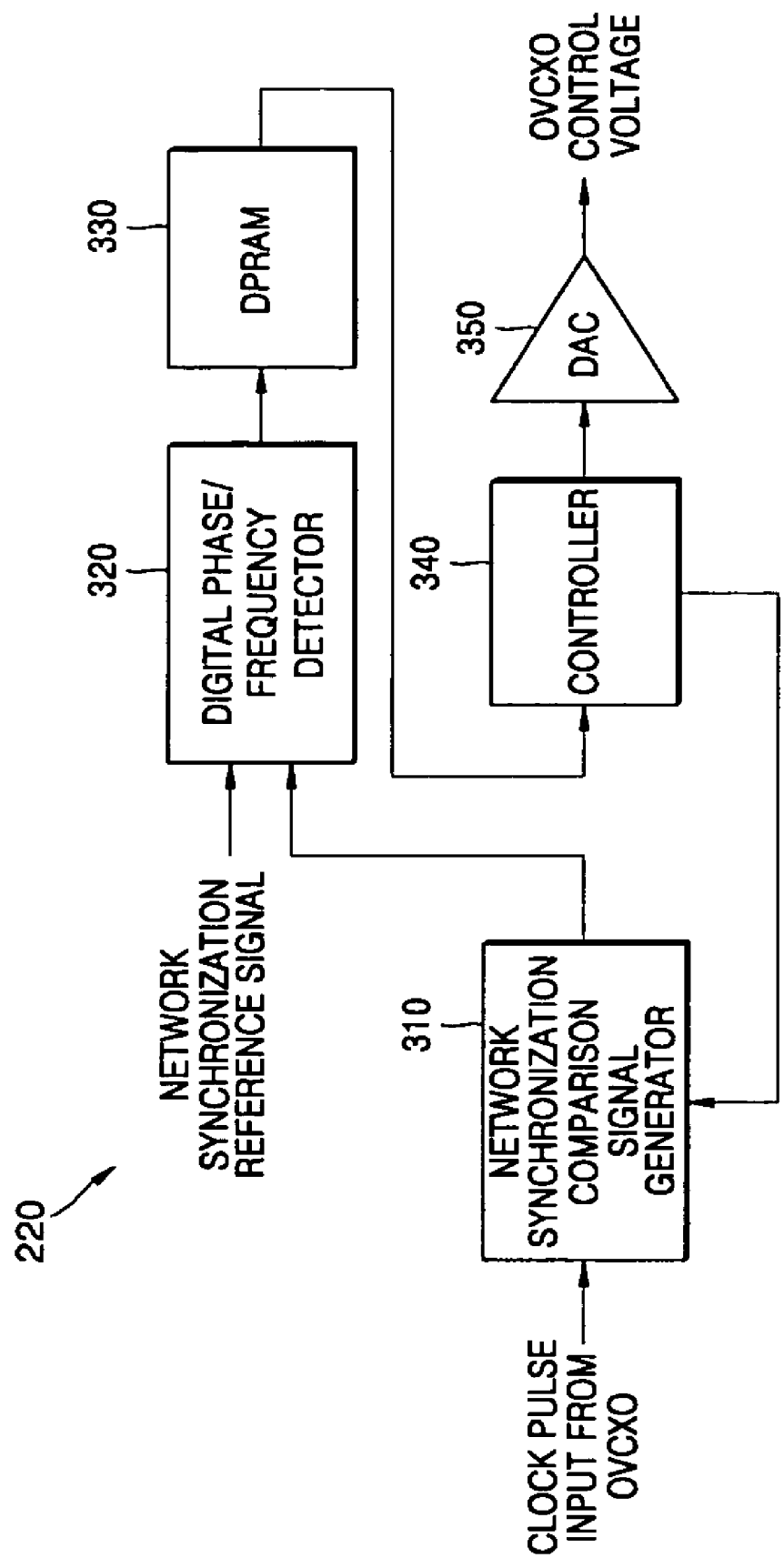
FIG. 3 is a detailed block diagram of a network synchronization controller of FIG. 2.

Referring to FIG. 3, a network synchronization controller 220 includes a network synchronization comparison signal generator 310, a digital phase/frequency detector 320, a controller 340, and a digital-to-analog converter (DAC) 350. The network synchronization controller 220 receives the network synchronization reference signal from the network synchronization reference signal generator 210, and receives a clock pulse generated by an ovenized voltage-controlled crystal oscillator (OVCXO) 230. Also, the network synchronization controller 220 generates an OVCXO control voltage that allows the clock pulse input from the OVCXO 230 to be in synchronization with the network synchronization reference signal input from the network synchronization reference signal generator 210.

The network synchronization comparison signal generator 310 receives the clock pulse from the OVCXO 230 and a predetermined set value for frequency dividing from the controller 340, frequency-divides the clock pulse using the set value, and generates and outputs a network synchronization comparison signal.

The digital phase/frequency detector 320 receives the network synchronization reference signal from the network synchronization reference signal generating unit 210 and the network synchronization comparison signal from the network synchronization comparison signal generator 310, and detects and outputs digital values corresponding to the differences in phase and frequency between the network synchronization reference signal and the network synchronization comparison signal.

The digital values are stored in a dual-port random access memory (DPRAM) 330. When the controller 340 requests the digital values, the digital values are output from the DPRAM 330 to the controller 340.

The controller 340 is preferably a microprocessor. The controller 340 checks the digital values stored in the DPRAM 330, and generates and outputs digital voltage values for controlling the OVCXO 230 such that the digital voltage values approximate to 0, i.e., so that the phase and frequency of the network synchronization comparison signal are equivalent to those of the network synchronization reference signal. Also, the controller 340 provides the set value for frequency dividing to the network synchronization comparison signal generator 310.

When the controller 340 outputs the digital voltage values for controlling the OVCXO 230 to the DAC 350, the DAC 350 generates and outputs the OVCXO control voltage by converting the digital voltage values into analog voltage values, so that the clock pulse output from the OVCXO 230 can be synchronized with the network synchronization reference signal. In this connection, Korean Patent No. 55805 discloses a circuit and control method for precisely adjusting a fine phase difference; Korean Patent No. 55873 discloses an apparatus and method for detecting a slip; Korean Patent No. 68841 discloses a method of synchronizing a fully electronic exchange with a network and providing a network synchronized clock; Korean Patent No. 89837 discloses a method of absorbing a jitter in a network synchronization apparatus in an electronic exchange; Korean Patent No. 115667, U.S. Pat. No. 5,525,935, and Japanese Patent No. 2653642 disclose a high-speed bit synchronization apparatus with a multi-level control structure; Korean Patent No. 123067 discloses a digital frequency detector for controlling a time required for synchronization and the extent of the synchronization; Korean Patent No. 194805 discloses a digital phase difference detector using a frequency deviation; and Korean Patent No. 262945 discloses an algorithm for controlling synchronization of a digital phase locked loop using a transition mode.

The OVCXO 230 is an OVCXO that is generally used in the fields of communications and measurement. The OVCXO 230 has frequency characteristics of 5 MHz or 10 MHz, has a precision of $1\times10^{-7}$ to $5\times10^{-10}$ Hz according to the hierarchy of a system in a network, and generates a clock pulse whose phase and frequency are changed depending on the OVCXO control voltage input from the network synchronization controller 220.

A system synchronization reference signal generator 240 receives the clock pulse from the OVCXO 230, and generates reference signals for synchronization with various types of systems. For instance, in the case of a voice exchange system, the reference signal for system synchronization is generated at a frequency of 2.048 MHz or 1.544 MHz. In the case of an asynchronous transfer mode (ATM) system, the reference signal for system synchronization is generated at a frequency of 155.520 MHz. In the case of an Ethernet system, the reference signal for system synchronization is generated at a frequency of 125 MHz.

Figure 4:
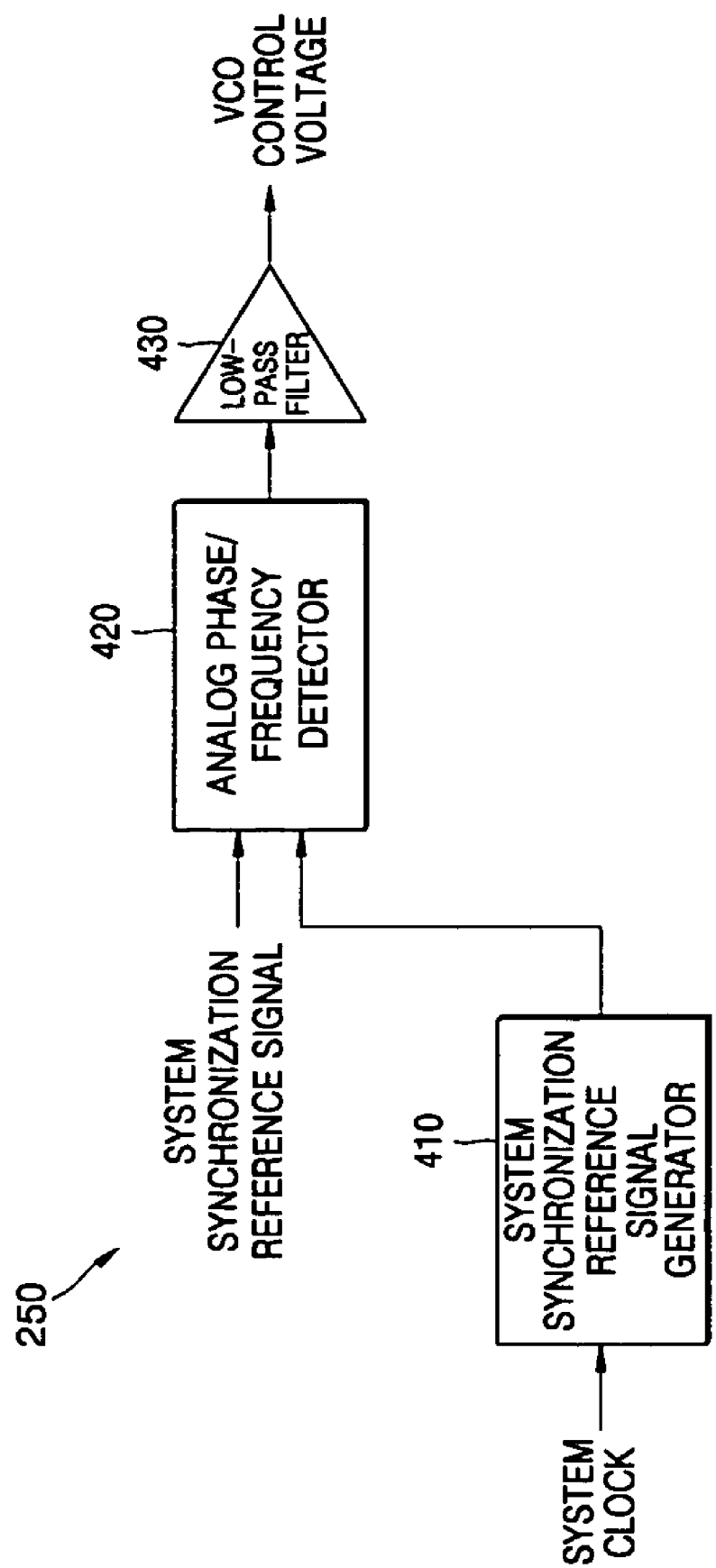
FIG. 4 is a detailed block diagram of a system synchronization controller of FIG. 2.

Referring to FIG. 4, a system synchronization controller 250 includes a system synchronization comparison signal generator 410, an analog phase/frequency detector 420, and a low-pass filter 430. The system synchronization controller 250 receives the reference signal for system synchronization from the system synchronization reference signal generator 240 and a system clock input from a system clock generator 270, and generates a voltage for controlling a voltage-controlled oscillator (VCO), the voltage allowing the reference signal for system synchronization to be in synchronization with the system clock.

That is, the system synchronization comparison signal generator 410 receives the system clock from the system clock generator 270 and frequency-divides the system clock to generate a comparison signal for system synchronization.

The analog phase/frequency detector 420 receives the reference signal for system synchronization from the system synchronization reference signal generator 240 and the comparison signal for system synchronization from the system synchronization comparison signal generator 410, and detects analog values of the differences in phase and frequency between the reference signal for system synchronization and the comparison signal for system synchronization.

The low-pass filter 430 low-pass filters or integrates an output of the analog phase/frequency detector 420 so as to obtain only a low-pass frequency component that contains a direct voltage as a VCO control voltage that allows a clock pulse generated by a VCO 260 to be synchronized with the reference signal for system synchronization.

The VCO 260 is a VCO that is commonly used in a communications system. The VCO 260 has frequency characteristics of several GHz, has a frequency deviation of $1\times10^{-3}$ to $1\times10^{-4}$, and generates a clock pulse whose phase and frequency are changed depending on the VCO control voltage input from the system synchronization controller 250.

The system clock generator 270 generates the system clock by frequency-dividing the clock pulse input from the VCO 260, and outputs it to the system synchronization controller 250 and a system that includes a clock generator according to the present invention.

As described above, an apparatus for providing a system clock synchronized to a network universally according to the present invention can be applied to all systems requiring network synchronization, since it adopts an OVCXO that has frequency characteristics of 5 Mhz or 10 MHz and is commonly used in the fields of communications and measurement, rather than an OVCXO with frequency characteristics inherent in a system. Accordingly, it is possible to reduce time and costs for designing the OVCXO and devices for network synchronization, thereby minimizing time and costs required for development of a system. Also, the present invention allows use the same VCO regardless of the type of a system, thereby making it easier to mass produce the VCO. Further, the present invention increases the degree of integration of semiconductor devices, thus increasing the degree of integration of hardware and reducing the size of a system.

While this invention has been particularly shown and described with reference to exemplary embodiments thereof, it will be understood by those skilled in the art that various changes in form and details may be made therein without departing from the spirit and scope of the invention as defined by the appended claims.

What is claimed is:

1. An apparatus for generating a system clock in synchronization with a network, comprising:
    a network synchronization reference signal generator receiving at least one reference signal from a communications network, selecting one of the received reference signal, frequency-dividing the selected reference signal, and outputting a reference signal for network synchronization;
    a network synchronization controller receiving the reference signal for network synchronization and a first clock pulse, and generating a first control voltage that allows the first clock pulse to be in synchronization with the reference signal for network synchronization;
    an ovenized voltage-controlled crystal oscillator (OVCXO) generating the first clock pulse whose phase and frequency are changed by application of the first control voltage;
    a system synchronization reference signal generator receiving the first clock pulse, frequency-dividing the first clock pulse, and generating different reference signals for system synchronization according to types of systems, the reference signal for system synchronization being used for synchronizing the system clock;
    a system synchronization controller receiving the reference signal for system synchronization and the system clock, and generating a second control voltage that allows the system clock to be in synchronization with the reference signal for system synchronization;
    a voltage-controlled oscillator (VCO) generating a second clock pulse whose phase and frequency are changed by application of the second control voltage; and
    a system clock generator receiving the second clock pulse, frequency-dividing the second clock pulse, and outputting the system clock.

2. The apparatus of claim 1, wherein the network synchronization controller comprises:
    a network synchronization comparison signal generator receiving the first clock pulse and a predetermined set value for frequency dividing, frequency-dividing the first clock pulse using the set value for frequency dividing, and outputting a comparison signal for network synchronization;
    a digital phase/frequency detector receiving the reference signal for network synchronization and the comparison signal for network synchronization, and detecting and outputting digital values corresponding to differences in phase and frequency between the reference signal for network synchronization and the comparison signal for network synchronization;
    a dual-port random access memory storing and outputting the digital values;
    a controller receiving the digital voltage values from the dual-port random access memory, outputting digital values for controlling the OVCXO such that the phase and frequency of the comparison signal for network synchronization are equivalent to the phase and frequency of the reference signal for network synchronization, and outputting the set value for frequency dividing; and
    a digital-to-analog converter receiving the digital value for the OVCXO control voltage, and converting the digital value into the first control voltage.

3. The apparatus of claim 1, wherein the system synchronization controller comprises:
    a system synchronization comparison signal generator receiving the system clock, frequency-dividing the system clock, and outputting a comparison signal for system synchronization;
    an analog phase/frequency detector receiving the reference signal for system synchronization and the comparison signal for system synchronization, and detecting and outputting analog values corresponding to differences in phase and frequency between the reference signal for system synchronization and the comparison signal for system synchronization; and
    a low-pass filter performing one of low-pass filtering and integrating of the differences in phase and frequency, and outputting the second control voltage.

4. The apparatus of claim 1, wherein the OVCXO has frequency characteristics of 5 MHz or 10 MHz and has a precision of $1 \times 10^{-7}$ to $5 \times 10^{-10}$ Hz according to a hierarchy of a system in the network, the system including the apparatus for generating the system clock in synchronization with the network.

5. The apparatus of claim 1, wherein the voltage-controlled oscillator has frequency characteristics of several GHz and a frequency deviation of $1 \times 10^{-3}$ to $1 \times 10^{-4}$.

* * * * *